(12) United States Patent
Enomoto

(10) Patent No.: US 12,032,422 B2
(45) Date of Patent: Jul. 9, 2024

(54) POWER SUPPLYING APPARATUS THAT SUPPLIES POWER TO EXTERNAL APPARATUS BASED ON POWER FLOW INFORMATION AND THE ROLE OF THE POWER SUPPLYING APPARATUS AND A METHOD OF CONTROLLING THE SAME

(71) Applicant: CANON KABUSHIKI KAISHA, Tokyo (JP)

(72) Inventor: Daisuke Enomoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 17/946,104

(22) Filed: Sep. 16, 2022

(65) Prior Publication Data

US 2023/0099247 A1 Mar. 30, 2023

(30) Foreign Application Priority Data

Sep. 27, 2021 (JP) .................................. 2021-157237

(51) Int. Cl.
G06F 1/26 (2006.01)
(52) U.S. Cl.
CPC .................................... G06F 1/266 (2013.01)
(58) Field of Classification Search
CPC .................................... G06F 1/26; G06F 1/266
See application file for complete search history.

(56) References Cited

U.S. PATENT DOCUMENTS

| | | | | |
|---|---|---|---|---|
| 2017/0244270 | A1* | 8/2017 | Waters | H02J 50/10 |
| 2018/0004279 | A1* | 1/2018 | Matsui | G06F 1/3212 |
| 2019/0199884 | A1* | 6/2019 | Shimamura | H04N 1/00928 |
| 2020/0209933 | A1* | 7/2020 | Shimamura | G06F 1/263 |
| 2020/0241615 | A1* | 7/2020 | Tanase | G06F 1/263 |
| 2023/0009995 | A1* | 1/2023 | Xiao | H04R 1/02 |
| 2023/0161723 | A1* | 5/2023 | Kasichainula | G06F 13/382 |
| | | | | 710/105 |

FOREIGN PATENT DOCUMENTS

| | | |
|---|---|---|
| JP | 2015-174375 A | 10/2015 |
| JP | 2019-086726 A | 6/2019 |

* cited by examiner

*Primary Examiner* — Raymond N Phan
(74) *Attorney, Agent, or Firm* — Cowan, Liebowitz & Latman, P.C.

(57) ABSTRACT

A power supplying apparatus stores power flow direction information related to a power role of the power supplying apparatus relative to an external apparatus in a storage, and performs control, in a case where the external apparatus has been connected to a connecter of the power supplying apparatus, to match a power role of the power supplying apparatus and a power role corresponding to the power flow direction information stored in the storage based on the power flow direction information stored in the storage unit.

20 Claims, 5 Drawing Sheets

| PID | Power Role | Date | Valid |
|---|---|---|---|
| 0xAABB | SRC | 2020/09/15 12:05:30 | YES |
| 0x0123 | SNK | 2020/09/14 08:20:00 | YES |
| 0xC256 | SRC | 2020/09/10 16:40:45 | YES |
| 0x74BC | SRC | 2020/08/23 16:40:45 | NO |

FIG. 5

POWER SUPPLYING APPARATUS THAT SUPPLIES POWER TO EXTERNAL APPARATUS BASED ON POWER FLOW INFORMATION AND THE ROLE OF THE POWER SUPPLYING APPARATUS AND A METHOD OF CONTROLLING THE SAME

BACKGROUND OF THE INVENTION

Field of the Invention

The present invention relates to a power supplying apparatus and a method of controlling the power supplying apparatus.

Description of the Related Art

Japanese Patent Laid-Open No. 2015-174375 describes a method of switching the direction of power flow so that power flows from an external apparatus whose remaining battery amount is large to an external apparatus whose remaining battery amount is small. Japanese Patent Laid-Open No. 2019-86726 describes a method of, when data transfer is performed between an image capturing apparatus and an accessory apparatus, controlling the direction of power flow based on power for data transfer and on the remaining battery amounts of respective apparatuses, so that data transfer is not interrupted.

A large burden is laid on a user with a method in which the user him/herself confirms whether the direction of power flow between a power supplying apparatus and an external apparatus is the direction of power flow desired by the user each time the power supplying apparatus and the external apparatus are connected.

SUMMARY OF THE INVENTION

The present disclosure has been made in consideration of the aforementioned issues, and realizes a reduction in a load on a user when setting the direction of power flow between a power supplying apparatus and an external apparatus.

In order to solve the aforementioned issues, one aspect of the present disclosure provides a power supplying apparatus comprising: a connector; a CPU; and a memory having stored therein a program for causing the power supplying apparatus to function as the following units in a case where the program has been executed by the CPU: a storage unit configured to store power flow direction information related to a power role of the power supplying apparatus relative to an external apparatus; and a control unit configured to, in a case where the external apparatus has been connected to the connector, perform control to match a power role of the power supplying apparatus and a power role corresponding to the power flow direction information stored in the storage unit based on the power flow direction information stored in the storage unit.

Another aspect of the present disclosure provides, a method of controlling a power supplying apparatus which comprises a connector and a storage device that stores power flow direction information related to a power role of the power supplying apparatus relative to an external apparatus, the method comprising: in a case where the external apparatus has been connected to the connector, performing control to match a power role of the power supplying apparatus and a power role corresponding to the power flow direction information stored in the storage device based on the power flow direction information stored in the storage device.

According to the present invention, a load on a user can be reduced when setting the direction of power flow between a power supplying apparatus and an external apparatus.

DESCRIPTION OF THE EMBODIMENTS

The following describes embodiments of the present invention with reference to the drawings. However, the present invention is not limited to the following embodiments.

First Embodiment

Figure 1:
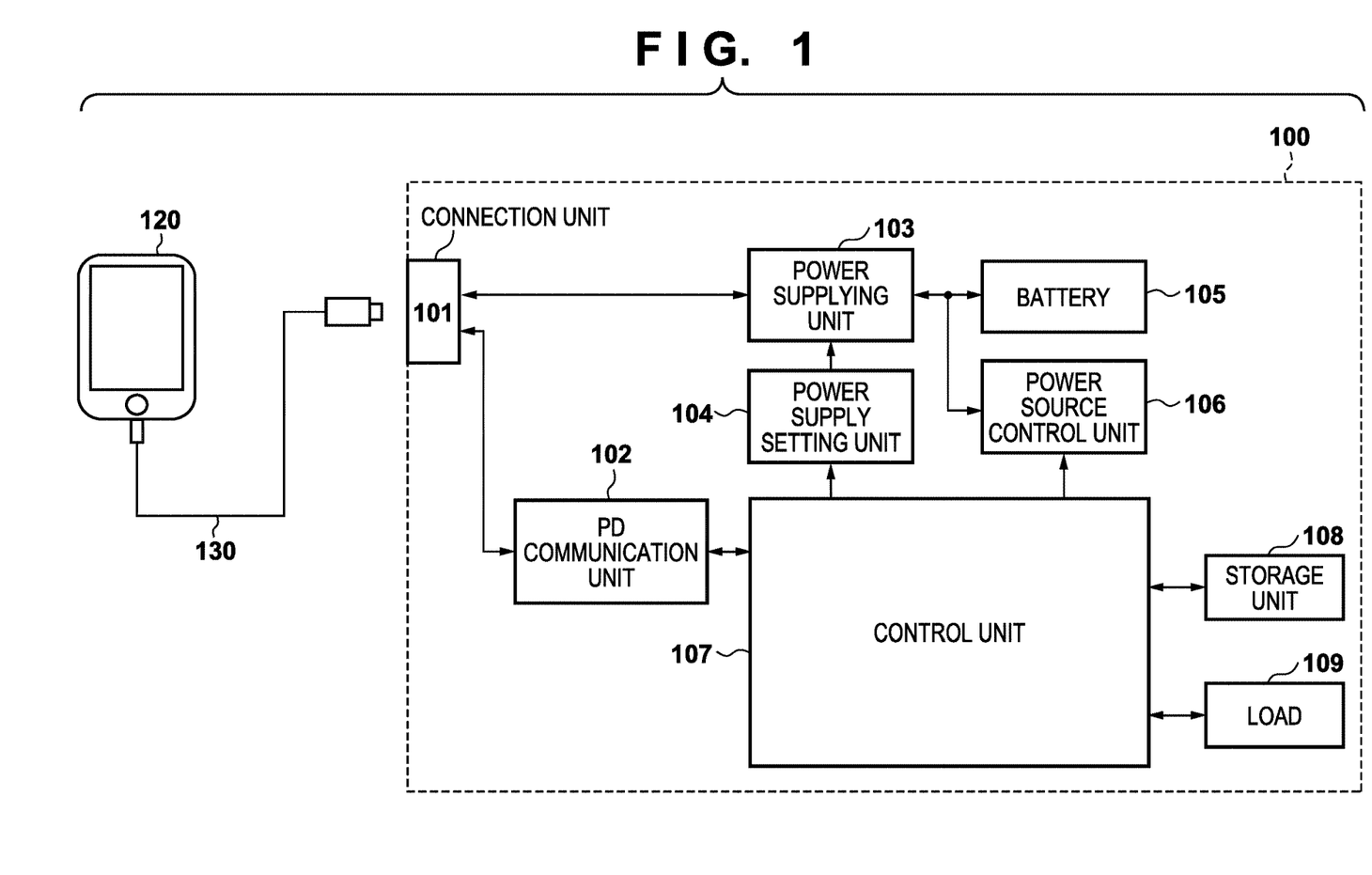
FIG. 1 is a block diagram for describing the constituent elements of a power supplying apparatus 100 according to a first embodiment.

FIG. 1 is a block diagram for describing the constituent elements of a power supplying apparatus 100 according to a first embodiment. The power supplying apparatus 100 is an apparatus that can operate as, for example, a digital camera or a smartphone. Note that each constituent element of the power supplying apparatus 100 includes an electronic circuit for realizing the functions to be described later.

An external apparatus 120 and the power supplying apparatus 100 are apparatuses that can supply power to each other bidirectionally. In an example of the first embodiment, the external apparatus 120 operates on power from a battery or an AC power source. The external apparatus 120 may also be an AC adaptor or a portable charger. A USB cable 130 is a cable that includes a plug that conforms to the USB (Universal Serial Bus) Type-C standard. The USB cable 130 enables communication and the supply of power between the power supplying apparatus 100 and the external apparatus 120.

Figure 2:
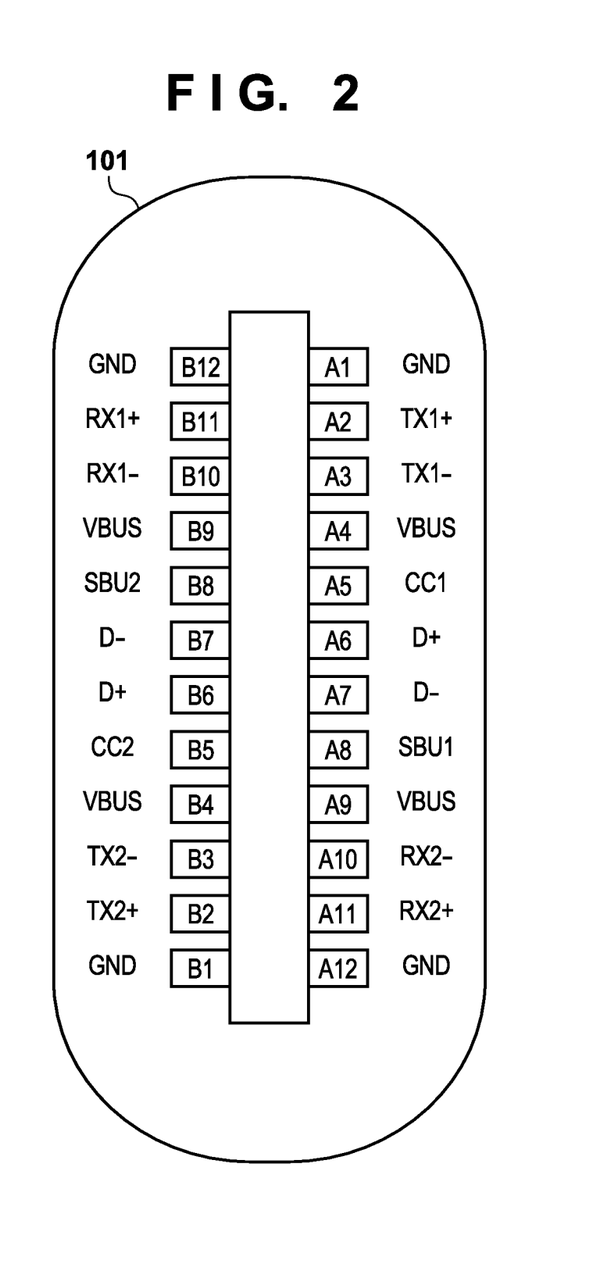
FIG. 2 is a diagram showing a pin arrangement of a USB Type-C connector.

The power supplying apparatus 100 and the external apparatus 120 can supply power to each other bidirectionally via the cable 130. A connection unit 101 includes a connector that connects to the cable 130. The connection unit 101 includes a receptacle that conforms to the USB Type-C standard. The connection unit 101 includes a plurality of terminals. The terminals of the connection unit 101 are shown in FIG. 2. The connection unit 101 includes VBUS terminals that supply power, a CC (Configuration Channel) terminal for obtaining information of the power supplying capability of the external apparatus 120, GND (Ground) terminals that serve as the base for signals, and so forth.

A control unit 107 includes one or more hardware processors (CPUs), and a memory such as a RAM. The control unit 107 controls the operations of each constituent element of the power supplying apparatus 100 and realizes the functions of each component of the power supplying apparatus 100 by executing a program stored in a storage unit 108. Note that in the first embodiment, the control unit 107 may also fulfill a part or all of the functions of a PD communication unit 102 and a power supply setting unit 104.

The PD communication unit 102 may be composed of, for example, one or more circuits. The PD communication unit 102 is connected to the CC terminals of the connection unit 101, and executes communication that conforms to the USB PD (USB Power Delivery) standard in response to an instruction from the control unit 107. Also, the PD communication unit 102 determines whether the external apparatus 120 connected to the connection unit 101 has a power supplying function and a power receiving function that conform to the USB PD standard, and notifies the control unit 107 of the result of the determination. The power supplying apparatus 100 can supply power and receive power in conformity with the USB PD standard. In a state before connection with the external apparatus 120 is established, signal lines of the CC terminals of the connection unit 101 periodically change between pull-up and pull-down. Also, in a case where the external apparatus 120 can supply power and receive power in conformity with the USB PD standard, it includes a connection unit similar to the connection unit 101 shown in FIG. 2. Furthermore, in the external apparatus 120 as well, in a state before connection with the power supplying apparatus 100 is established, signal lines of the CC terminals periodically change between pull-up and pull-down. Therefore, in a case where the power supplying apparatus 100 and the external apparatus 120 are connected, the power roles of the power supplying apparatus 100 and the external apparatus 120 are randomly determined in accordance with the signal level of the CC terminals at the time of establishment of connection. The power roles are roles related to the supply of power, and include an apparatus that supplies power (source: SRC) and an apparatus that receives power (sink: SNK). Then, the power roles of the power supplying apparatus 100 and the external apparatus 120 determine the direction of power flow. Here, the direction of power flow indicates the supply of power from the power supplying apparatus 100 to the external apparatus 120, or the supply of power from the external apparatus 120 to the power supplying apparatus 100. After the initial direction of power flow has been determined in this manner, the control unit 107 performs negotiation communication based on communication protocols that conform to the USB PD standard, and establishes power supplying conditions, which include a power supplying voltage and current, with the external apparatus 120. Note that once the power role of the power supplying apparatus 100 has been determined, the direction of power flow is set; therefore, in the following description, determination of the direction of power flow and determination of the power role of the power supplying apparatus 100 are practically the same.

A power supplying unit 103 may be composed of, for example, one or more circuits. The power supplying unit 103 is connected to the VBUS terminals of the connection unit 101, and can supply power supplied from the external apparatus 120 to each constituent element of the power supplying apparatus 100. Also, the power supplying unit 103 can supply power to the external apparatus 120 with use of power supplied from a battery 105 inside the power supplying apparatus.

The power supply setting unit 104 may be composed of, for example, one or more circuits. The power supply setting unit 104 sets the direction of power flow of the power supplying unit 103 in accordance with an instruction from the control unit 107. With use of the PD communication unit 102, the control unit 107 performs communication for switching the direction of power flow based on communication protocols that conform to the USB PD standard; consequently, the power supply setting unit 104 can switch the direction of power flow to/from the external apparatus 120. Here, it can be said that the communication for switching the direction of power flow is also communication for changing the power roles. The power supply setting unit 104 sets the direction of power flow of the power supplying unit 103 in response to an instruction from the control unit 107.

A power source control unit 106 may be composed of, for example, one or more circuits. The power source control unit 106 supplies power supplied from the battery 105 or the power supplying unit 103 to each constituent element of the power supplying apparatus 100.

The storage unit 108 may include, for example, a semiconductor memory, such as an electrically rewritable non-volatile memory (EEPROM). The storage unit 108 stores various types of information obtained from the external apparatus 120, power flow direction information, and so on. The power flow direction information is information related to the direction of power flow in the power supplying apparatus 100 relative to the external apparatus 120. The power flow direction information includes, for example, individual identification information for identifying the external apparatus 120, and information of the power role of the power supplying apparatus 100 relative to the external apparatus 120. The information of the power role indicates, for example, one of a source (SRC) and a sink (SNK). The information of the power role in the power flow direction information may include, for example, information of the power role of the external apparatus 120 in another embodiment. Various types of information obtained from the external apparatus 120 are obtained by, for example, the control unit 107 performing communication with the external apparatus 120 based on communication protocols that conform to the USB PD standard with use of the PD communication unit 102.

A load 109 is composed of various types of modules, and includes a load that operates by consuming power from the power source control unit 106. Power consumed by the load 109 changes in accordance with the operating state of the power supplying apparatus 100. Various types of modules that compose the load 109 in the power supplying apparatus 100, which is a digital camera, include, for example, an image sensor that converts a subject image into electrical image information, a display unit that displays shot images, a notification to a user, and the like (a display such as an LCD display), an operation unit that is based on various types of switches, and so on. Also, these various types of modules may include image capturing lenses that can be driven in order to zoom and focus on a subject image.

Figure 3:
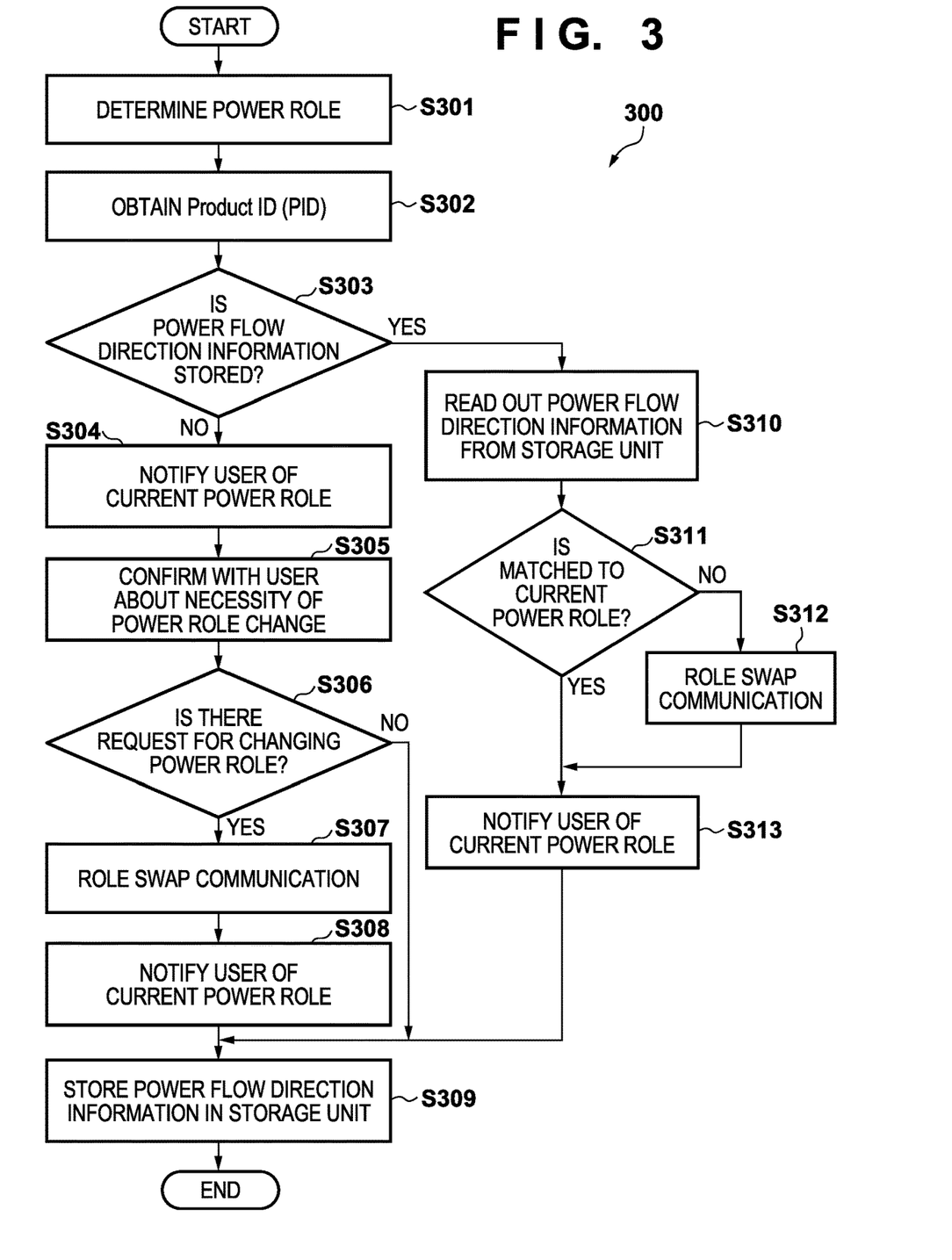
FIG. 3 is a flowchart for describing power supplying control processing according to the first embodiment.

Next, power supplying control processing 300 in the power supplying apparatus 100 will be described with reference to FIG. 3. Note that the power supplying control processing 300 is controlled by the control unit 107 executing a program stored in the storage unit 108. Also, the power supplying control processing 300 is started in a case where, for example, the external apparatus 120 is connected to the connection unit 101 via the cable 130.

In step S301, once the external apparatus 120 has been connected to the connection unit 101 via the cable 130, the control unit 107 determines the power role of the power supplying apparatus 100 based on the USB PD standard in accordance with the signal level of the CC terminals at the time of establishment of connection. Note that the following description will be provided using an exemplary case where, for example, the power roles have been determined so that the power supplying apparatus 100 acts as a source (SRC) and the external apparatus 120 acts as a sink (SNK).

The control unit 107 performs negotiation communication based on communication protocols that conform to the USB PD standard with use of the PD communication unit 102, and establishes power supplying conditions including the voltage and current to be supplied to the external apparatus 120. Thereafter, the control unit 107 controls the power supplying unit 103 via the power supply setting unit 104 so as to start the supply of power in line with the established power supplying conditions. Note that in a case where the power roles have been determined so that the power supplying apparatus 100 acts as a sink in step S301, the power supplying apparatus 100 receives power supplied from the external apparatus 120. Therefore, the control unit 107 performs negotiation communication based on communication protocols that conform to the USB PD standard with use of the PD communication unit 102, and requests the external apparatus 120 for a voltage and current. Then, power supplied from the external apparatus 120 is received via the connection unit 101.

In step S302, the control unit 107 obtains a PID (Product ID) as individual identification information of the external apparatus 120 from the external apparatus 120 via the PD communication unit 102. Note that other than the PID, information that is unique to the external apparatus 120, such as a serial number and a vendor ID, may be used as the individual identification information of the external apparatus 120.

In step S303, the control unit 107 determines, based on the obtained PID, whether the power flow direction information associated with the external apparatus 120 is stored in the storage unit 108. In a case where it is determined that the power flow direction information associated with the external apparatus 120 is not stored in the storage unit 108, the control unit 107 causes the processing 300 to proceed to step S304. In a case where it is determined that the power flow direction information associated with the external apparatus 120 is stored in the storage unit 108, the control unit 107 causes the processing 300 to proceed to step S310.

In step S304, the control unit 107 displays the current power role of the power supplying apparatus 100, which was determined in step S301, on the display unit included in the load 109, thereby presenting the same to a user. Also, in step S305, the control unit 107 displays a notification that prompts the user for an instruction about whether there is a request to change the power role (here, from the source to the sink) on the display unit included in the load 109, thereby presenting the same to the user. Here, it can be said that the request to change the power role is a request to switch the direction of power flow.

In step S306, the control unit 107 determines whether the request for changing the power role has been accepted from the user. In a case where the request for changing the power role has not been accepted from the user, the control unit 107 causes the processing 300 to proceed to step S309. In a case where the request for changing the power role has been accepted from the user, the control unit 107 causes the processing 300 to proceed to step S307.

In step S307, the control unit 107 changes the power roles by performing processing of a request to change the power roles (role swap) with respect to the external apparatus 120 based on communication protocols that conform to the USB PD standard via the PD communication unit 102. As a result of thus changing the power roles, for example, the power supplying apparatus 100 acts as a sink, and the external apparatus 120 acts as a source. Here, it can be said that changing of the power roles is switching of the direction of power flow. In step S308, the control unit 107 displays the changed, current power roles on the display unit included in the load 109, thereby presenting the same to the user. Also, as the power role of the power supplying apparatus 100 changed to the sink, the control unit 107 requests the external apparatus 120 for a voltage and current, and receives power supplied from the external apparatus 120 via the connection unit 101, by controlling the PD communication unit 102.

In step S309, the control unit 107 causes the storage unit 108 to store the PID of the external apparatus 120 and the current power role of the power supplying apparatus 100 as the power flow direction information associated with the external apparatus 120.

On the other hand, in a case where the power flow direction information associated with the external apparatus 120 is stored in the storage unit 108 (Yes of step S303), the control unit 107 reads out the power flow direction information, which includes information of the power role relative to the external apparatus 120, from the storage unit 108 in step S310. Then, in step S311, the control unit 107 determines whether the current power role of the power supplying apparatus 100 that was determined in step S301 matches the power role indicated by the information of the power role that was read out in step S310. In a case where it is determined that the current power role of the power supplying apparatus 100 that was determined in step S301 matches the power role that was read out in step S310, the control unit 107 causes the processing 300 to proceed to step S313. In a case where it is determined that the current power role of the power supplying apparatus 100 that was determined in step S301 does not match the power role that was read out in step S310, the control unit 107 causes the processing 300 to proceed to step S312.

In step S312, the control unit 107 changes the power roles by performing processing of a request to change the power roles (role swap) with respect to the external apparatus 120, similarly to step S307. In step S313, the control unit 107 displays the current power role of the power supplying apparatus 100, which was determined in step S301, on the display unit included in the load 109, thereby presenting the same to the user. Thereafter, as described above, the control unit 107 causes the storage unit 108 to store the PID of the external apparatus 120 and the current power role of the power supplying apparatus 100 as the power flow direction information relative to the external apparatus 120 in step S309.

As described above, in the first embodiment, the control unit 107 stores, into the storage unit 108, the power flow direction information that includes identification information of the external apparatus 120 that was connected in the past and information indicating the power role of the power supplying apparatus 100 relative to this external apparatus. Then, in a case where the external apparatus 120 has been newly connected and the storage unit 108 stores the power flow direction information associated with the external apparatus 120, the control unit 107 performs control to make the power role of the power supplying apparatus 100 automatically match the power role stored in the storage unit 108. This can alleviate the user's trouble of confirming the power role that was randomly determined immediately after connecting to the external apparatus 120 and re-setting the power role as necessary.

Figure 4:
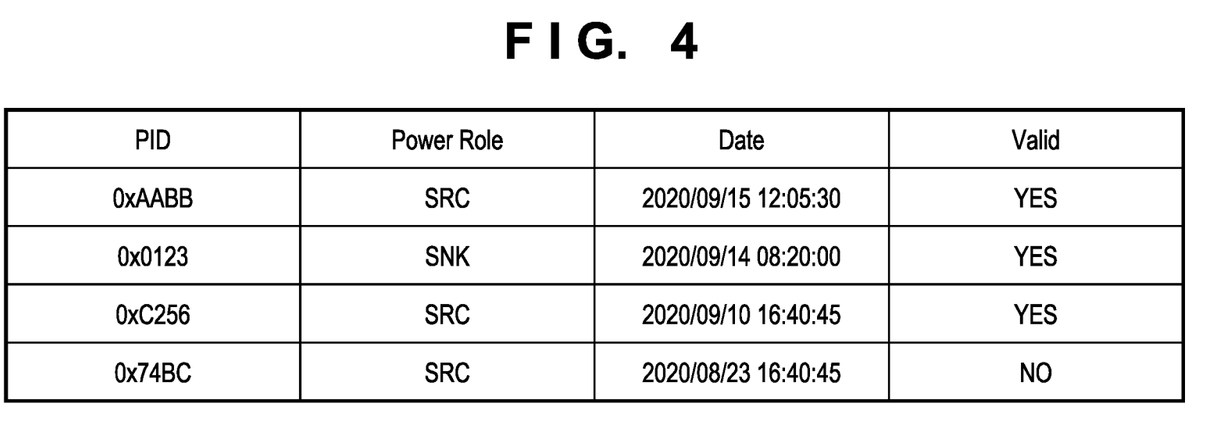
FIG. 4 is a diagram for describing one example of power flow direction information according to a second embodiment.

Note that the first embodiment has been described using an exemplary case where the power supplying apparatus 100 and the external apparatus 120 are connected in one-to-one correspondence. However, the first embodiment is not limited to this. For example, as shown in FIG. 4, the storage unit 108 may store pieces of power flow direction information that include a plurality of PIDs and power roles that are respectively associated with the PIDs. Using identification information of an external apparatus that has been newly connected, the control unit 107 discerns whether the storage unit 108 stores the power flow direction information of this external apparatus. Then, in a case where the storage unit 108 stores the power flow direction information of the connected external apparatus, the control unit 107 reads out information of the power role relative to this external apparatus. Then, the control unit 107 makes the power role of the power supplying apparatus 100 match the power role indicated by the information of the power role that has been read out. In this way, in a case where the power supplying apparatus 100 is connected to the plurality of external apparatuses 120 alternatingly, the user's trouble of re-setting the power role of the power supplying apparatus 100 each time connection with an external apparatus 120 is established can be alleviated. This makes it possible to address a use case where the user uses the plurality of external apparatuses 120 that are connected alternatingly. In a case where a digital camera is assumed as the power supplying apparatus 100 of the first embodiment, various types of accessories such as an external flash apparatus and a wireless image transfer apparatus are assumed as external apparatuses 120. The first embodiment makes it possible to prevent, or reduce the frequency of, re-setting of the power role upon each connection in a case where these accessories are connected alternatingly. Therefore, the operating efficiency of a shooting workflow that is performed while connecting to the accessories alternatingly can be improved.

Second Embodiment

Next, a second embodiment will be described. The first embodiment has been described using an exemplary case where power flow direction information, once stored into the storage unit 108, thereafter remains held and valid continuously. However, in the second embodiment, in a case where a predetermined period has elapsed since power flow direction information was stored, the power supplying apparatus 100 automatically changes this power flow direction information. Power flow direction information is shown in FIG. 4. The power flow direction information shown in FIG. 4 includes a plurality of items. The plurality of items include a PID indicating an ID of an external apparatus that has been connected, a power role indicating a power role of the power supplying apparatus 100 relative to the external apparatus, the date on which information of the power role was stored, and Valid indicating whether the corresponding information of the power role is valid or invalid. For example, as shown in FIG. 4, information of the date/time on which the power role was stored and information indicating whether the power role is valid or invalid (Valid) are further stored, in association, as the power flow direction information. In a case where the predetermined period has elapsed since the information of the power role was stored into the storage unit 108, the information of the power role stored in the storage unit 108 is rendered invalid. Note that the second embodiment differs from the description of the first embodiment in a part of the power supplying control processing 300 and in a part of the constituents of the power flow direction information, but is practically the same thereas in the configuration of the power supplying apparatus 100. Therefore, the same constituents and processing are given the same reference numerals, and the description thereof is omitted; the description of the differences will be focused.

Figure 5:
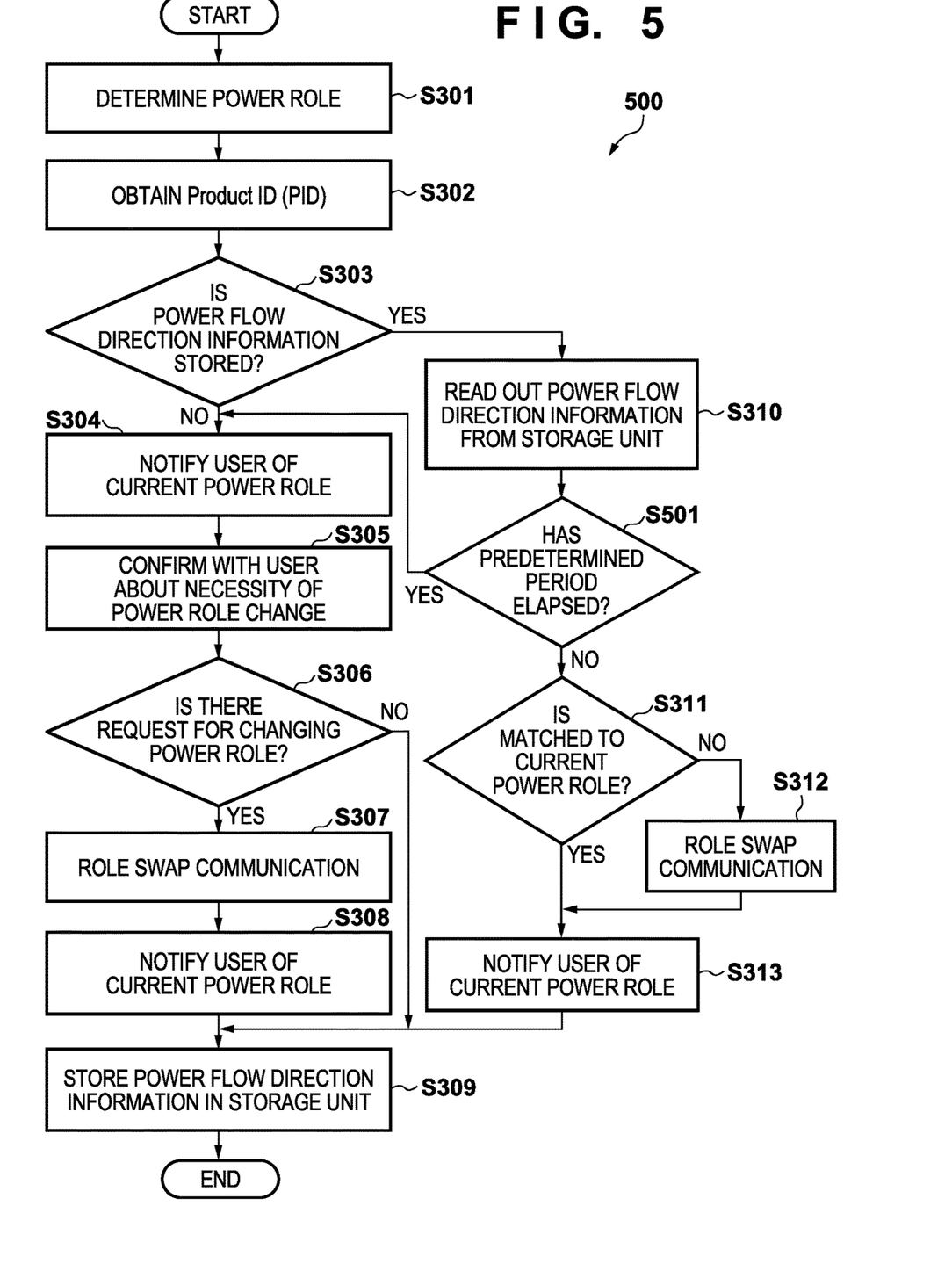
FIG. 5 is a flowchart for describing power supplying control processing according to the second embodiment.

In power supplying control processing 400 shown in FIG. 5, in a case where the predetermined period has elapsed since the information of the power role relative to the external apparatus 120, which is included in the power flow direction information, was stored, the control unit 107 renders the power role information in the power flow direction information invalid.

For example, the control unit 107 executes processing of steps S301 to S309 and step S310 similarly to the first embodiment. After processing of step S310 has been executed, in step S501, the control unit 107 compares the information of the date/time on which the information of the power role corresponding to the PID was stored, which is included in the power flow direction information stored in the external apparatus 120, with information of the current date/time. Then, the control unit 107 determines whether the predetermined period has elapsed since the information of the power role was stored to date. In a case where the predetermined period has elapsed since the date/time on which the information of the power role was stored, the control unit 107 causes the processing 400 to proceed to step S304. In a case where the predetermined period has not elapsed since the date/time on which the power role information was stored, the control unit 107 causes the processing 400 to proceed to step S311. Thereafter, the control unit 107 executes processing of steps S311 to S313 similarly to the first embodiment.

As described above, in a case where the same external apparatus 120 is connected again within the predetermined period, the control unit 107 automatically re-sets the power role so that the power role matches the power role of the power flow direction information stored in the storage unit 108. On the other hand, in a case where a certain period has elapsed, the control unit 107 causes the display unit of the load 109 to display a notification that prompts a user to re-set the power role. In this way, in a case where external apparatuses 120 are connected alternatingly within a relatively short period of time, the trouble of setting the power role upon each connection can be avoided. It is also possible to prevent an unintended power role from being continued automatically without the user being aware of it.

Third Embodiment

At least one of the various functions, processing, and methods that have been described in the above embodiments can also be realized by a personal computer, a microcomputer, a CPU (Central Processing Unit), or a microprocessor executing a program. Hereinafter, a personal computer, a microcomputer, a CPU, or a microprocessor is referred to as a "computer X" in the third embodiment. In the third embodiment, a program which is intended to control the computer X and which is intended to realize at least one of the various functions, processing, and methods described in the above embodiments, is referred to as a "program Y".

At least one of the various functions, processing, and methods described in the above embodiments is realized by the computer X executing the program Y. In this case, the program Y is provided to the computer X via a computer-readable storage medium. The computer-readable storage medium according to the third embodiment includes at least one of a hard disk apparatus, a magnetic storage apparatus, an optical storage apparatus, a magneto-optical storage apparatus, a memory card, a volatile memory, a nonvolatile memory, and so forth. The computer-readable storage medium according to the third embodiment is a non-transitory storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157237, filed Sep. 27, 2021 which is hereby incorporated by reference herein in its entirety.

What is claimed is:

1. A power supplying apparatus comprising:
   a connector;
   a CPU; and
   a memory having stored therein a program for causing the power supplying apparatus to function as the following units in a case where the program has been executed by the CPU:
      a storage unit that stores power flow direction information related to a power role of the power supplying apparatus relative to an external apparatus;
      a determination unit that determines, in a case where an external apparatus has been connected to the connector, a power role of the power supplying apparatus relative to the external apparatus connected to the connector;
      a reading unit that reads out the power flow information from the storage unit in a case where the external apparatus has been connected to the connector; and
      a control unit that performs control to determine, in a case where the external apparatus has been connected to the connector, whether the power role of the power supplying apparatus determined by the determination unit matches the power role of the power supplying apparatus indicated by the power flow direction information read out from the storage unit based on the power flow direction information read out from the storage unit or not and change the power role of the power supplying apparatus so that the power role of the power supplying apparatus matches the power role of the power supplying apparatus indicated by the power flow direction information if it is determined that the power role of the power supplying apparatus determined by the determination unit does not match the power role of the power supplying apparatus indicated by the power flow direction information.

2. The power supplying apparatus according to claim 1, wherein
   the power supplying apparatus supplies power and receives power in conformity with a USB Power Delivery standard, and
   in a case where the power role of the power supplying apparatus is a source of the USB PD standard, the control unit performs control to supply power to the external apparatus connected to the connector, whereas in a case where the power role of the power supplying apparatus is a sink of the USB PD standard, the control unit performs control to receive power from the external apparatus connected to the connector.

3. The power supplying apparatus according to claim 1, wherein
   the power flow direction information includes identification information of the external apparatus and power role information indicating the power role of the power supplying apparatus relative to the external apparatus, and
   the control unit determines whether the power role of the power supplying apparatus determined by the determination unit matches the power role indicated by the power role information which is included in the power flow direction information and which corresponds to the identification information of the connected external apparatus or not.

4. The power supplying apparatus according to claim 1, wherein the power supplying apparatus supplies power and receives power in conformity with a USB Power Delivery standard, and
   wherein the control unit determines that the power role of the power supplying apparatus determined by the determination unit does not match the power role indicated by the power flow direction information if the power role of the power supplying apparatus determined by the determination unit is a source of the USB PD standard and the power role of the power supplying apparatus indicated by the power flow information is a sink of the USB PD standard.

5. The power supplying apparatus according to claim 1, wherein the control unit stores power flow direction information indicating the power role of the power supplying apparatus determined by the determination unit in a case where the power flow direction information related to the power supplying apparatus relating to the connected external apparatus does not stored in the storage unit.

6. The power supplying apparatus according to claim 3, wherein the program, when executed by the CPU, further causes the power supplying apparatus to function as:
   a communication unit that communicates with the connected external apparatus, and using the identification information of the connected external apparatus that has been obtained from the connected external apparatus via communication performed by the communication unit, the control unit specifies the power role indicated by the power role information which is included in the power flow direction information and which corresponds to the identification information of the connected external apparatus.

7. The power supplying apparatus according to claim 4, wherein the control unit performs the control to change the power role of the power supplying apparatus to the sink of the USB PD standard if the power role of the power supplying apparatus determined by the determination unit is the source of the USB PD standard and the power role of the power supplying apparatus indicated by the power flow information is the sink of the USB PD standard.

8. The power supplying apparatus according to claim 6, wherein
the determination unit determines the power role of the power supplying apparatus upon establishment of connection of the external apparatus to the connector, and
the control unit specifies a power role relative to the connected external apparatus with use of the identification information of the connected external apparatus that has been obtained from the connected external apparatus via communication performed by the communication unit after the power role has been determined by the determination unit, and
in a case where the power role of the power supplying apparatus determined by the determination unit differs from the power role that has been specified based on the power flow direction information, the control unit controls the communication unit so that predetermined communication for causing the power role of the power supplying apparatus to match the specified power role is automatically performed.

9. The power supplying apparatus according to claim 8, wherein
the power supplying apparatus supplies power and receives power in conformity with a USB Power Delivery standard, and
the predetermined communication is communication for requesting the connected external apparatus to switch a power role in accordance with the USB PD standard.

10. The power supplying apparatus according to claim 8, wherein
in a case where the predetermined communication for causing the power role of the power supplying apparatus to match the specified power role has been performed, the control unit performs control to display, on a display unit, the power role specified based on the power flow direction information, and
in a case where the power role information corresponding to the identification information of the connected external apparatus is not stored in the storage unit, the control unit performs control to display the determined power role on the display unit.

11. A method of controlling a power supplying apparatus which comprises a connector and a storage device that stores power flow direction information related to a power role of the power supplying apparatus relative to an external apparatus, the method comprising:
determining, in a case where an external apparatus has been connected to the connector, a power role of the power supplying apparatus relative to the external apparatus connected to the connector;
reading out the power flow information from the storage device in a case where the external apparatus has been connected to the connector;
performing control to determine, in a case where the external apparatus has been connected to the connector, whether the power role of the power supplying apparatus determined in the determining matches the power role of the power supplying apparatus indicated by the power flow direction information read out from the storage device based on the power flow direction information read out from the storage device or not; and
performing control to change the power role of the power supplying apparatus so that the power role of the power supplying apparatus matches the power role indicated by the power flow direction information if it is determined that the power role of the power supplying apparatus determined in the determining does not match the power role of the power supplying apparatus indicated by the power flow direction information.

12. The method according to claim 11, wherein
the power supplying apparatus supplies power and receives power in conformity with a USB Power Delivery standard, and further comprising:
performing control to supply power to the external apparatus connected to the connector in a case where the power role of the power supplying apparatus is a source of the USB PD standard; and
performing control to receive power from the external apparatus connected to the connector in a case where the power role of the power supplying apparatus is a sink of the USB PD standard.

13. The method according to claim 11, wherein
the power flow direction information includes identification information of the external apparatus and power role information indicating the power role of the power supplying apparatus relative to the external apparatus, and
the performing the control to change causes the power role of the power supplying apparatus to match the power role indicated by the power role information which is included in the power flow direction information and which corresponds to the identification information of the connected external apparatus.

14. The method according to claim 11, wherein the power supplying apparatus supplies power and receives power in conformity with a USB Power Delivery standard, and
wherein in the performing to determine, it is determined that the power role of the power supplying apparatus determined in the determining does not match the power role indicated by the power flow direction information if the power role of the power supplying apparatus determined in the determining is a source of the USB PD standard and the power role of the power supplying apparatus indicated by the power flow information is a sink of the USB PD standard.

15. The method according to claim 11, further comprising:
storing power flow direction information indicating the power role of the power supplying apparatus determined in the determining in the storage device in a case where the power flow direction information related to the power supplying apparatus relating to the connected external apparatus does not stored in the storage device.

16. The method according to claim 13, further comprising communicating with the connected external apparatus, wherein the performing of the control to determine specifies, with use of the identification information of the connected external apparatus that has been obtained from the connected external apparatus in the communicating, the power role indicated by the power role information which is included in the power flow direction information and which corresponds to the identification information of the connected external apparatus.

17. The method according to claim 14, wherein in the performing the control to change, the power role of the power supplying apparatus is changed to the sink of the USB PD standard if the power role of the power supplying apparatus determined in the determining is the source of the USB PD standard and the power role of the power supplying apparatus indicated by the power flow information is the sink of the USB PD standard.

18. The method according to claim 16, wherein
the determining determines the power role of the power supplying apparatus upon establishment of connection of the external apparatus to the connector, and
the performing the control to determine specifies a power role relative to the connected external apparatus with use of the identification information of the connected external apparatus that has been obtained from the connected external apparatus via the communication after the power role has been determined in the determining, and
the performing the control to change controls, in a case where the power role of the power supplying apparatus determined in the determining differs from the power role that has been specified based on the power flow direction information, the communication so that predetermined communication for causing the power role of the power supplying apparatus to match the power role relative to the connected external apparatus is automatically performed.

19. The method according to claim 18, wherein
the power supplying apparatus supplies power and receives power in conformity with a USB Power Delivery standard, and
the predetermined communication is communication for requesting the connected external apparatus to switch a power role in accordance with the USB PD standard.

20. The method according to claim 18, further comprising:
displaying, on a display unit, the power role specified based on the power flow direction information in a case where the predetermined communication for causing the power role of the power supplying apparatus to match the specified power role has been performed, and
displaying the determined power role on the display unit in a case where the power role information corresponding to the identification information of the connected external apparatus is not stored in the storage device.

* * * * *